United States Patent
Bamford

(10) Patent No.: US 10,594,605 B2
(45) Date of Patent: *Mar. 17, 2020

(54) DYNAMIC PACKET ROUTING

(71) Applicant: Level 3 Communications, LLC, Broomfield, CO (US)

(72) Inventor: Stewart Bamford, London (GB)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/189,554

(22) Filed: Nov. 13, 2018

(65) Prior Publication Data

US 2019/0081896 A1    Mar. 14, 2019

Related U.S. Application Data

(63) Continuation of application No. 15/205,351, filed on Jul. 8, 2016, now Pat. No. 10,129,149.

(51) Int. Cl.
*H04L 12/741* (2013.01)
*H04L 12/715* (2013.01)

(52) U.S. Cl.
CPC ............ *H04L 45/745* (2013.01); *H04L 45/04* (2013.01); *H04L 45/54* (2013.01)

(58) Field of Classification Search
CPC ........ H04L 45/745; H04L 45/54; H04L 45/04
See application file for complete search history.

(56) References Cited

U.S. PATENT DOCUMENTS

| 8,611,349 B1* | 12/2013 | Judge | H04L 41/12 370/392 |
| 2010/0281388 A1* | 11/2010 | Kane | H04L 41/0213 715/736 |
| 2011/0134769 A1 | 6/2011 | Lee et al. | |
| 2012/0209942 A1* | 8/2012 | Zehavi | H04L 29/08729 709/213 |

(Continued)

OTHER PUBLICATIONS

IEEE, May 2003, Quoitin et al. (Interdomain Traffic Engineering with BGP).*

(Continued)

*Primary Examiner* — Lakeram Jangbahadur

(57) ABSTRACT

The present invention generally relates to methods of routing packets in a network comprising Autonomous Systems (ASs), next hop determiners for routing packets in such a network, systems for routing packets in such a network, and route indicator feeders for providing modified route indicators. A method of routing packets in such a network may comprise: obtaining route indicators each comprising: an indicator of a network prefix; and an indicator of an AS path for delivering packets to an AS having the network prefix; identifying at least one said route indicator having an AS path indicator comprising a predetermined AS identifier; storing the network prefix indicator of each said identified route indicator; receiving at least one packet having an address indicating a destination; and if the destination address of said packet is within an address range defined by a said stored prefix indicator, transmitting the packet on a non-peering connection to the AS having the predetermined AS identifier.

14 Claims, 10 Drawing Sheets

(56) References Cited

U.S. PATENT DOCUMENTS

| | | | |
|---|---|---|---|
| 2014/0198794 A1* | 7/2014 | Mehta | H04L 45/74 370/392 |
| 2014/0310427 A1 | 10/2014 | Shaw et al. | |
| 2017/0004423 A1 | 1/2017 | DeLuisi et al. | |
| 2017/0012876 A1 | 1/2017 | Bamford | |

OTHER PUBLICATIONS

International Preliminary Report on Patentability dated Jan. 9, 2018, Int'l Appl. No. PCT/GB16/051941, Int'l Filing Date Jun. 29, 2016; 8 pgs.
International Search Report dated Oct. 7, 2016, Int'l Appl. No. PCT/GB16/051941, Int'l Filing Date Jun. 29, 2016; 7 pgs.
Written Opinion of the International Searching Authority dated Oct. 7, 2016, Int'l Appl. No. PCT/GB16/051941, Int'l Filing Date Jun. 29, 2016; 7 pgs.
Bonaventure, Olivier et al., "Interdomain Traffic Engineering with BGP", *IEEE Communications Magazine* vol. 41, No. 5 May 1, 2003 00:00:00.0 , pp. 122-128.
Gao, Lixin et al., "Stable Internet Routing Without Global Coordination", *IEEE/ACM Transactions on Networking* vol. 9, No. 6 Dec. 1, 2001 00:00:00.0 , pp. 681-692.
Masuda, Akeo et al., "SpliTable: Toward Routing Scalability through Distributed BGP Routing Tables", *IEICE Trans. Commun.* vol. E94B, No. 1 Jan. 1, 2011 00:00:00.0 , pp. 64-76.
Pelsser, Christel et al., "Improving Route Diversity through the Design of iBGP Topologies", *IEEE International Conference on Communications* XP031266394 May 19, 2008 00:00:00.0 , pp. 5732-5738.
European Examination Report, dated Feb. 27, 2019, Application No. 16736565.9, filed Jun. 29, 2016; 7 pgs.
European Examination Report, dated Aug. 9, 2019, Application No. 16736565.9, filed Jun. 29, 2016; 6 pgs.

* cited by examiner

DYNAMIC PACKET ROUTING

FIELD OF THE INVENTION

The present invention generally relates to methods of routing packets in a network comprising Autonomous Systems (ASs), next hop determiners for routing packets in a network comprising ASs, systems for routing packets in a network comprising ASs, and route indicator feeders for providing modified route indicators.

BACKGROUND TO THE INVENTION

The Internet can generally be described as a group of networks in the form of Autonomous Systems (AS). The ASs may belong to different owners and be connected by Border Gateway Protocol (BGP) peering; such peering may involve exchange of IP traffic based on eBGP sessions. Parties such as content and/or service providers generally mutually agree to peering and thus make public the addresses of servers, routers etc. on their ASs. Peering can take place between networks of many types and may be a customer/provider based peering, or a peer/peer settlement-free interconnect type peering.

Increasingly, entities such as service and/or content providers need the ability to deliver content to a particular AS such as an eyeball network ('eyeball'). An eyeball may present the content to the end-user, e.g., a machine and/or terminal for example having a user- (man-machine) interface. An eyeball may be a local provider of fixed and/or mobile telephone, television and/or broadband Internet services. The content delivery may however be impeded by the lack of any direct relationship between the provider and the eyeball: The eyeball may be neither a customer nor a peer of the provider, and may be merely a customer of a third party; the third party may in turn be a customer of the provider; the provider may peer with that third party.

Such a provider may currently provide content to such an eyeball by routing the content through the third party network. This may however present technical difficulties concerning packet delivery performance and/or where the third party purchases Internet connectivity from the provider and may not wish to pay for delivering the provider's traffic to the eyeball.

On the other hand, use of a direct BGP peering between the provider and the eyeball, i.e., not involving the third party, would generally involve a settlement-free interconnect. This may not present a mutually beneficial arrangement.

As an alternative to such peering, it may be considered to use a Deep Edge Cache (DEC), e.g., a normal Content Delivery Network (CDN) server of the provider, dedicated to the particular eyeball. One or more links may be provided between the CDN device and eyeball as shown in FIG. 1, the CDN device generally providing a single type of content. This arrangement, which may be considered to be a 1:1 multiplex situation, may represent an inefficient use of the CDN device, since the CDN server may not be able to deliver every type of content and/or may be able to deliver only to a particular eyeball.

Alternatively, as shown in FIG. 2, multiple CDN devices, e.g., Deep Edge Caches, may be connected by respective links to respective eyeballs. This may be considered an extension of the 1:1 multiplex situation, with similar disadvantages regarding efficiency.

The arrangements of FIGS. 1 and 2 may further be undesirable for example because they do not provide dynamic routing, for example if static links such as non-BGP are employed.

There therefore remains a need in the field of content delivery to provide for example a content delivery path between non-peering autonomous systems such as a provider AS and/or an eyeball AS, and/or such a path that is more efficient for example in terms of inventory capital cost and/or usage of inventory capacity, that allows high performance packet delivery, e.g., with low latency and/or high reliability, and/or that allows dynamic and/or reliable routing, etc.

SUMMARY

According to a first aspect of the present invention, there is provided a method of routing packets in a network comprising Autonomous Systems (ASs), the method comprising: obtaining route indicators each comprising: an indicator of a network prefix; and an indicator of an AS path for delivering packets to an AS having the network prefix; identifying at least one said route indicator having an AS path indicator comprising a predetermined AS identifier; storing the network prefix indicator of each said identified route indicator; receiving at least one packet having an address indicating a destination; and if the destination address of said packet is within an address range defined by a said stored prefix indicator, transmitting the packet on a non-peering connection to the AS having the predetermined AS identifier.

Generally, a non-peering connection may be a connection between ASs that do not perform exchange of network prefix indicators (e.g., prefixes on the ASs). Thus, a non-peering connection may not transfer BGP messages or perform any BGP session. For example, a non-peering connection may only transfer content packets.

An embodiment may thus allow dynamic routing of packets from a provider AS to a particular, e.g., eyeball, AS, without involving a peering connection there between. This may be achieved by using the AS identifiers (e.g., AS numbers) of AS path indicators within the route indicators, to allow prefix-based routing, where for example a prefix 100.1.1.0/24 comprises an address 100.1.1.10 and a net mask/24. Such dynamic prefixed-based routing may be considered to be BGP-like, even though the routing does not require a direct BGP peering with the particular AS.

Advantageously, such routing may allow the transmission from the provider AS to the particular AS via the non-peering connection to be performed for example with lower latency and/or higher reliability than if the packet was alternatively routed via an intermediary AS to the particular AS. This may be of benefit for example in an Internet Protocol network where the provider AS is a content and/or service provider, and/or where the particular AS is an eyeball such as a local provider of fixed and/or mobile telephone, television and/or broadband Internet services.

The routing may be performed based on obtaining and storing the network prefix indicators (preferably, the prefixes themselves) of one or more particular AS(s), wherein correspondence of any prefix to one or more predetermined ASs (prefix originating and/or transiting ASs) may be effectively learnt based on AS path indicators of one or more route indicators having the prefix. Thus, the dynamic routing of an embodiment may take advantage of the availability of network prefixes, provided for example in route indicators based on content of a Global Routing Table. Each route indicator may be an entry in a routing table, or a message comprising an AS path and prefix obtained from such an entry. A route indicator for example in the form of a path vector message e.g., eBGP message, may comprise, amongst other things, a network prefix indicator, an AS path indicator and preferably a next hop address indicator. Each AS path indicator may have AS identifier (s) of the AS(s) traversed by a message to reach the AS providing the route indicator indicating that path. The AS path indicator generally may identify the message origin AS and potentially one or more intermediate ASs along the path leading to the AS providing the route indicator. The AS path indicator may further identify (e.g., by comprising the AS number of) the AS providing the route indicator.

The learnt prefixes of a particular, e.g., eyeball, AS are generally originated from that AS. The originating AS may be on a peering connection to a third party (intermediary) AS, and the advertised routing information from the originating AS may be propagated further by means of route indicators from the third party AS. Similar propagation of the routing information through one or more further ASs may be performed, to allow the routing information eventually reach the provider AS. Such propagation may allow widespread generation of routing tables within the network, such as versions of a Global Routing Table which is widely available and generally updated by the constituent ASs advertising their prefixes. The propagation of network prefix indicators from the originating AS to the table may allow the prefixes for the originating AS to be gathered from such a routing table; the entire content of, and/or updates to, such a table may be obtained by means of the route indicators of an embodiment.

A packet may be routed via a non-peering connection to a particular AS because the packet destination address is within a range defined by the stored network prefix indicator, e.g., within a prefix stored in association with the AS identifier of that particular AS. The particular AS may have the destination address, or the particular AS may merely be an AS on a path to the packet's destination. The latter may be the case for example where the prefix has been stored in association with a predetermined AS identifier detected within an AS path indicator comprising more than one AS identifier (e.g., where the AS path indicator of a routing indicator is 123_456_789 and the predetermined AS identifier is AS number 456). Regardless, the transmission of a packet to the particular AS may comprise determining a next hop address that is on the non-peering connection and transmitting the packet to that address by means of the non-peering connection.

In a preferred embodiment, the non-peering connection is one of a plurality of non-peering connections (each such connection preferably connected to a respective AS such as an eyeball network) and said predetermined AS identifier is one of a plurality of predetermined AS identifiers. The identifying may comprise identifying at least one said route indicator having an AS path indicator comprising a said predetermined AS identifier. The storing may comprise storing the network prefix indicator of each said identified route indicator in association with an indication of the AS having the predetermined AS identifier indicated by the AS path indicator of the route indicator. Such storing in association may be achieved, e.g., by storing each network prefix indicator with the identifier of the corresponding AS together in an element of a list or database, or by adding each network prefix indicator to a collection of prefixes for the corresponding AS, a label of the collection being the AS identifier. The transmitting may comprise selecting a said non-peering connection (e.g., by selecting an address on that connection) based on the AS identifier associated with the stored prefix that defines the address range comprising the destination address of the packet, and transmitting the packet on the selected non-peering connection. Preferably, the/each predetermined AS identifier, and/or indication of the AS having the predetermined AS identifier, comprises at least one of: the AS number of the AS; and an address of the AS, preferably an address of at least one of a router, switch and server of the AS.

In such a preferred embodiment, a first received packet may be routed on a selected non-peering connection to a first AS, whereas another received packet may be routed on another selected non-peering connection to a second AS. Selection among groups of one or more such connections to respective ASs may allow a dynamic 1:N or N:N routing (where N is 2 or more).

The packets may be received from a single server such as a Content Delivery Network (CDN) server. More preferably, however, they may be received from a plurality of such servers; in this case, the aforementioned N:N routing may be performed. The server(s), which may or may not be part of the provider AS, may be remote from the provider AS, which may send packets to such server(s) for onwards transmission to their respective destinations.

The network may comprise at least one intermediary AS, wherein a said intermediary AS peers with the AS having the predetermined AS identifier. The network prefix indicator of a said identified route indicator may be received from (preferably originally generated at) an AS having a said predetermined AS identifier via the at least one intermediary AS. The AS path indicator of that identified route indicator may comprise an AS path indicator received from said intermediary AS. In such an embodiment, an AS on the non-peering connection (e.g., eyeball) may advertise its prefix(es), preferably directly, to such an intermediary AS. The provider AS may be connected to the AS on the non-peering connection by a route having the, and potentially at least one further, intermediary AS. The prefix indicator and AS path indicator of any one or more of the route indicators may be derived originally from the AS having the predetermined AS identifier and propagated via one or more intermediary ASs. The peering with the intermediary AS may allow an exchange of traffic and routing information, generally without the owners of either originator or intermediary AS paying the other for the exchange; similar may apply to peering between any two ASs on the path of the route indicator information. The provider AS may output at least some of the route indicators based on the information obtained via at least one such intermediary AS, and these route indicators may then be used for dynamic routing.

Advantageously, for example where the network is an IP network such as the Internet, the route indicators may comprise messages in accordance with a dynamic routing protocol for exchanging routing information between ASs. The messages may be in the form of path vector messages, and the dynamic routing protocol may be Border Gateway Protocol (BGP). Dynamic routing may then be performed, so that an embodiment may be considered BGP-like.

Optionally, each route indicator indicates a next hop address in addition to at least the network prefix indicator. The method may then comprise: if the destination address is not within a said stored network prefix indicator, transmitting the packet to the next hop address of a said route indicator having a network prefix indicator defining an address range comprising the destination address. Thus, such a packet may not be transmitted on the non-peering connection; instead the packet may be routed on a series of one or more other generally peering connection(s) to reach its destination. The route followed by the packet may then involve a provider AS, one or more intermediary ASs and the destination, e.g., eyeball, AS.

In an embodiment where each route indicator indicates a next hop address, the method may comprise: modifying the identified route indicator by changing (e.g., replacing) the next hop address of the identified route indicator to indicate an address on the non-peering connection to the AS having the predetermined AS identifier; the storing comprising storing the network prefix indicator of at least one said modified route indicator in association with the changed next hop address of that modified identified route indicator; and the transmitting comprising transmitting the packet to a said stored changed next hop address that is associated with a said stored network prefix indicator defining an address range comprising the packet destination address. Such an embodiment may be referred to as a 'modified BGP' embodiment. Optionally, such modified route indicators are received in a feed of such indicators (e.g., a 'modified BGP feed'), preferably from the provider AS, e.g., a route indicator feeder of the provider AS. Alternatively however, the route indicator(s) may be modified, or at least their changed next hop address(es) determined, at a next hop determiner for performing the packet transmission. The packet transmission may involve forwarding the modified next hop indicator to the changed/modified next hop address, in addition to the packet.

Such an embodiment involving changing a next hop address may comprise, upon a said transmission of a said packet on a said non-peering connection, marking data of a said route indicator having a network prefix indicator defining a range comprising a packet destination address and monitoring on the basis of the marked route indicators: to which, and/or to how many, ASs packets are being transmitted on non-peering connections; how many packets are being transmitted to a said AS having a predetermined AS identifier; which, and/or how many, next-hop addresses are changed; which, and/or how many, messages are transited by a said AS having a predetermined AS identifier; which, and/or how many, messages are originated by a said AS having a predetermined AS identifier. The marking may mark the changed route indicators, or may mark specifically the prefixes of these route indicators. The received route indicators (e.g., of a route indicator feed from the provider AS), and/or the changed route indicators (e.g., a changed feed, also referred to as a 'modified feed'), may be marked for monitoring/analysis.

More specifically, the marking of a route indicator may be achieved by adding or changing one or more communities to the route indicator. The monitoring may thus monitor only those route indicators (or data thereof) having the changed next hop addresses and/or those which have one or more predetermined communities. Such a community may indicate that the route indicator is from a customer of a specific provider, may indicate a type of route, and/or may indicate a geographic location.

In a preferred embodiment, the method may use the route indicators together with CDN logic, to determine for which network prefix indicators of the route indicators packets are transmitted on a said non-peering connection Such CDN logic may comprise rule(s) for choosing a content delivery point, e.g., CDN server. The rules may be based on, e.g., time of day or physical or logical location of the client, etc. The CDN logic may be stored in a memory of, and thus may be obtained from, the provider AS. The combining of route indicators and CDN logic may allow an embodiment to tailor content delivery using the dynamic (e.g., BGP-like) routing to be optimised according to one or more characteristics such as content type, content provider preferences, types, loads and/or capacities of different CDN servers, time of day, client location, etc. This may allow, e.g., increased speed of delivery and/or higher reliability.

In one implementation, wherein the network comprises a provider AS and a next hop determiner, the receiving may comprise establishing at the next hop determiner at least one connection for transfer of the at least one packet from the provider AS to at least one (preferably CDN) server via the next hop determiner, and receiving at the next hop determiner the at least one packet from the at least one server. Such establishment may comprise a 2-way communication such as a handshake, e.g., a TCP communication involving a handshake process for connection establishment before data transfer. The two-way communication may be between the next hop determiner and a fill server of the provider AS. The connection may allow fill of a packet server for example from a fill server of a provider AS. The packets may then be received from the packet server (e.g. CDN server) and then transmitted onwards by the next hop determiner. As in any embodiment, the next hop determiner may be a core part of the provider AS or may be external to the provider AS.

Consistent with the above, in an embodiment for example implemented for routing packets in the Internet, the AS on the non-peering connection may comprise an eyeball network. Additionally or alternatively, the at least one packet is received from at least one CDN server.

According to a second aspect of the present invention, there is provided a next hop determiner for routing packets in a network comprising Autonomous Systems (ASs), comprising: at least one packet input port to receive packets, each packet having an address indicating a destination; at least one packet output port configured to transmit packets on a non-peering connection to an AS; a routing input port to receive route indicators, each said route indicator comprising: an indicator of a network prefix; and an indicator of an AS path for delivering packets to an AS having the network prefix; a comparator to compare a predetermined AS identifier to each said AS path indicator of said received route indicators, to identify at least one said route indicator having an AS path indicator comprising the predetermined AS identifier; and a memory configured to store the network prefix indicators of a said at least one identified route indicator; and a director configured to, if the destination address of a said packet is within an address range defined by a said stored network prefix indicator, route the packet to a said output port for transmission on a said non-peering connection to the AS having the predetermined AS identifier.

Where more than one comparator is provided, each comparator may identify route indicators having an AS path indicator comprising a respective predetermined (i.e. stored) AS identifier. This may effectively allow 1:N or N:N routing. The memory may store one or more said network prefix indicators in association with an identifier of the corresponding AS, e.g. the relevant AS number or an address on the AS.

In a preferred embodiment, the next hop determiner is configured to obtain, e.g., receive via for example a provider AS, the route indicators from an Internet routing table such as a Global Routing Table. Thus, widely available prefixes for one or more ASs may enable the dynamic routing. (Regardless, each route indicator may further comprise a next hop address and/or other attributes).

According to a third aspect, there may be provided a next hop determiner for routing packets in a network comprising Autonomous Systems (ASs), comprising: at least one packet input port to receive packets, each packet having an address indicating a destination; at least one packet output port configured to transmit packets on a non-peering connection to an AS; a routing input port to receive modified route indicators, each said modified route indicator comprising: an indicator of a network prefix; and a next hop address on an AS having the network prefix; a memory configured to store the network prefix indicator and next hop address of said modified route indicators; and a director configured to, if the destination address of a said packet is within an address range defined by a said stored network prefix indicator, route the packet to a said output port for transmission on a said non-peering connection to the next hop address.

Similarly as for the first aspect, embodiments of the second or third aspects may thus allow dynamic, prefix-based, routing of packets to a particular AS, without involving a peering connection to that AS. The dynamic routing may be considered to be BGP-like, however without the routing itself requiring a direct BGP peering with the particular AS. This may provide for example lower latency and/or higher reliability routing, which may be of advantage for example in an IP network.

Each modified route indicator of the second aspect may further comprise an indicator of an AS path for delivering packets to an AS having the network prefix.

In the second or third aspect, each said route indicator or modified route indicator may comprise a message in accordance with a dynamic routing protocol such as Border Gateway Protocol. Such a message may comprise a prefix, AS path and next hop address. Thus, the message may be a path vector message.

In the second or third aspect, the network may comprise a provider AS and the NHD may receive the route indicators from the provider AS. Indeed, a routing table for generating the route indicators, e.g., a version of the Global Routing Table, may be stored at the provider AS. The packets to be transmitted may be received from server(s), e.g. from the provider AS via one or more servers such as CDN servers.

The next hop determiner of the second or third aspect may comprise a switch such as a Multi-Layer Switch (MLS), preferably wherein at least one said packet output port of the switch comprises an Ethernet port. Additionally or alternatively, the next hop determiner may comprise a router, preferably wherein at least one said packet output port of the router comprises an Ethernet port. Similarly, at least one packet input port of the next hop determiner may be for receiving IP-over-Ethernet packets.

The next hop determiner of the second or third aspect may be connected by means of a first connection to transfer a said packet from a server (preferably CDN server) to a said input packet port, and a second connection to transfer the packet from a said output packet port to an AS, wherein the second connection is a said non-peering connection and the first and second connections have different Layer 2 connectivity. Different Layer 2 connectivities may be, e.g. 1G, 10G or 100G (G here referring to Gbit/s Ethernet). This may allow some flexibility with regard to the Layer 2 connections of the server(s) and eyeball AS(s) of an embodiment.

There may further be provided the next hop determiner of either aspect, configured to transmit to a default address any said received packet having a destination address that is not within a said stored prefix. The default address, for example an address on a provider AS and/or of a router or switch, may be stored in memory of the next hop determiner.

According to another aspect of the present invention, there is provided a route indicator feeder for providing modified route indicators, comprising: an input port to receive route indicators, each said route indicator comprising: an indicator of a network prefix; and an indicator of an AS path for delivering packets to an AS having the network prefix; a comparator to compare a predetermined AS identifier to each said AS path indicator, to identify a said route indicator having an AS path indicator comprising the predetermined AS identifier; a route indicator modifier to, in response to a said identification by the comparator, change the identified route indicator to indicate an address on the AS having the predetermined AS identifier; and an output port to transmit the modified route indicator. The route indicator feeder may be, e.g., a BGP feed device, preferably comprised in a provider AS.

Such a route indicator feeder may be provided, wherein each said received route indicator further comprises a next hop address and the route indicator modifier changes the next hop address of the identified route indicator to be the address on the AS having the predetermined AS identifier.

The route indicator feeder may be used to provide a 'modified BGP feed' to a next hop determiner.

There may further be provided a next hop determination system comprising a plurality of next hop determiners as set out above, the system comprising: a routing server configured to feed at least some (preferably all) of the route indicators to each one of the plurality of next hop determiners, preferably wherein each said next hop determiner is configured to redirect, e.g., distribute, packets among a respective group of one or more ASs. Thus, prefixes may be made centrally available by the routing server to distributed next hop determiners. This may allow efficiencies to be made if the prefix-based dynamic routing is to be implemented at different locations in the network. The next hop determiners may have non-peering connections to different, or overlapping, groups of (e.g., eyeball) ASs.

A system for routing packets in a network comprising (AS) may comprise at least one next hop determiner as set out above, and at least one server (e.g. CDN server) configured to deliver packets by default to a said packet input port of a said next hop determiner; at least one said non-peering connection to transfer packets from a said output packet port of the next hop determiner, each said non-peering connection configured to provide a non-peering connection to a respective AS; and at least one said respective AS. Thus, the system may effectively provide 1:1, 1:N or N:N routing between server(s) and AS(s).

There may further be provided the system comprising: a provider AS configured to transmit the packets to the at least one server; an intermediary AS configured to peer with an AS having a said predetermined AS identifier and to propagate a network prefix indicator received from the AS having the predetermined AS identifier; and a routing feed connection to feed said route indicators from the provider AS to the next hop determiner, wherein a said route indicator comprises the network prefix indicator received from the AS having the predetermined AS identifier. The peering may allow exchange of traffic and routing information, e.g. by means of a "settlement-free", "bill-and-keep" or "sender keeps all" arrangement. The routing feed connection may provide a BGP message feed. Routing information derived by/via the intermediary AS may be used to generate a routing table (e.g. a version of a Global Routing Table). Such information, and/or updates to the table, may be forwarded by means of the routing feed connection.

The system may comprise a route indicator feeder as described herein, preferably as part of a provider AS, to provide a modified route indicator to the next hop determiner. Preferably, the route indicators from the route indicator feeder are BGP messages. The next hop determiner may then route packets to the modified next hop addresses according to correspondence between packet destination addresses and prefix indicators received in the modified route indicators.

Additionally or alternatively, the system may comprise a next hop determination system as set out above.

Advantageously, at least one said respective AS may comprise an eyeball network.

There may be provided a network comprising a system as set out above, preferably wherein the network is an IP network and/or a wide area network. The network may for example be the Internet.

According to another aspect of the present invention, there is provided a system for routing packets in a network comprising AS, the system comprising: means for obtaining route indicators each comprising: an indicator of a network prefix; and an indicator of an AS path for delivering packets to an AS having the network prefix; means for identifying at least one said route indicator having an AS path comprising a predetermined AS identifier; means for storing the network prefix of each said at least one identified route indicator; means for receiving at least one packet, a said packet having an address indicating a destination; and means for, if the destination address is within a said stored prefix, transmitting the packet on a non-peering connection to the AS having the predetermined AS identifier.

Preferred embodiments are defined in the appended dependent claims.

Any one or more of the above aspects and/or any one or more of the above optional, i.e., preferable, features of the preferred embodiments may be combined, in any permutation. Furthermore, any of the above methods may be provided as corresponding apparatus, and vice versa.

BRIEF DESCRIPTION OF THE DRAWINGS

For a better understanding of the invention and to show how the same may be carried into effect, reference will now be made, by way of example, to the accompanying drawings, in which.

DETAILED DESCRIPTION OF PREFERRED EMBODIMENTS

Generally, an embodiment may allow content providers, who may or may not be the operators of large IP networks, the ability to deliver dynamic content to end-user networks (generally known as eyeball networks) over private and/or public interconnects, without having for example a direct external Border Gateway Protocol (eBGP) relationship with that eyeball network over that interconnection.

Rather than such a connection using a direct, e.g., eBGP based, peering over the interconnection to enable dynamic content delivery, it may be possible to enable static routes from content provider to eyeball network. However, this does not allow for dynamic, e.g., prefix-based, delivery that comes with eBGP for example. In contrast, an embodiment of the present invention may allow dynamic, e.g., prefix-based, delivery without configuring eBGP.

Advantageously, embodiments may enable content providers to deliver content directly to eyeball networks without having to use an intermediary third-party network which may introduce costs and/or performance degradation. In such embodiments, the content provider need have no direct relationship (e.g., customer or peer) with the eyeball network. Thus packet delivery performance may be improved and/or made more cost-efficient, neither party need purchase transit from the other, and/or one or both parties may avoid being seen to peer with the other.

Example embodiments are described below with reference to the drawings.

Figure 7:
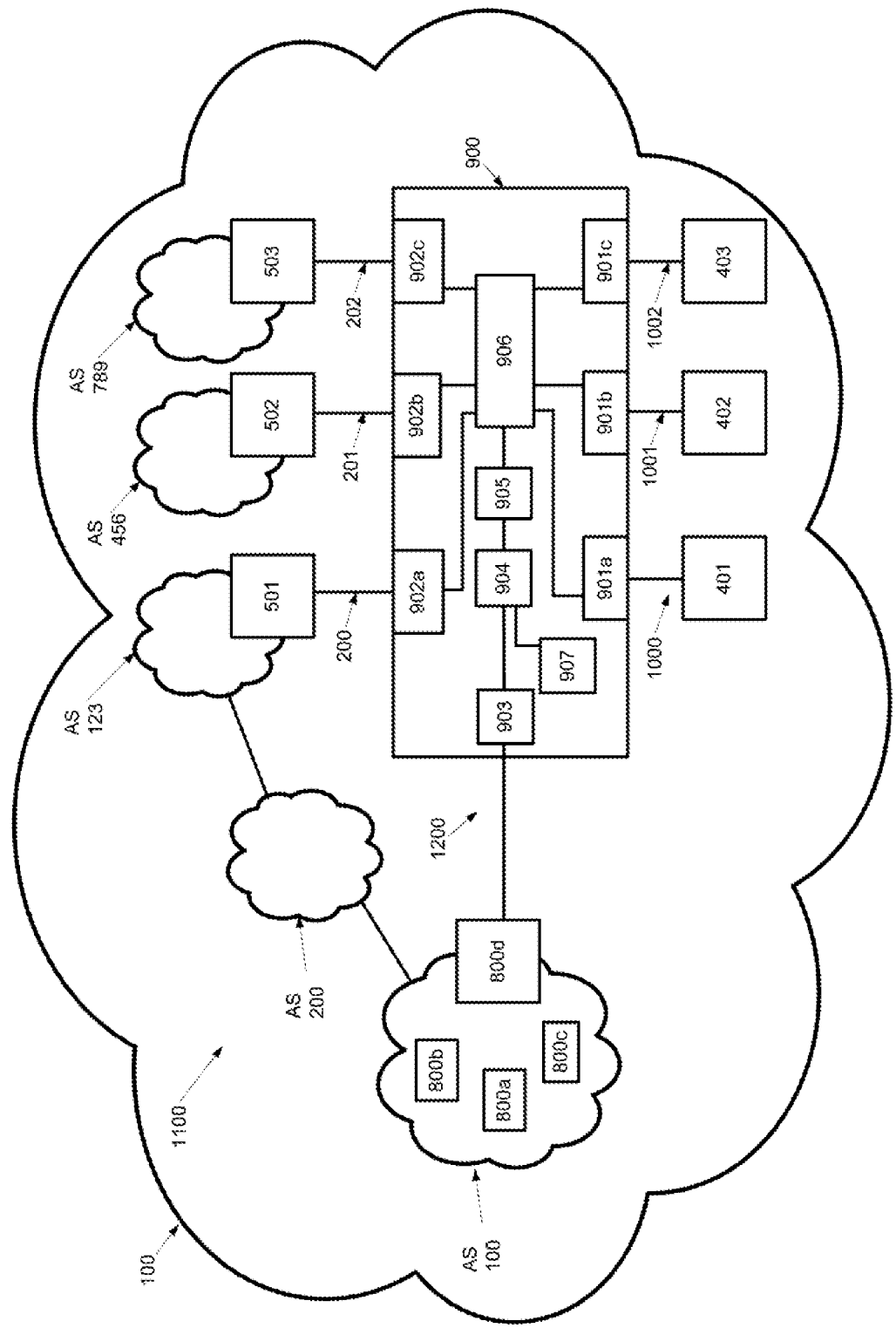
FIG. 7 shows an IP network comprising an embodiment generally corresponding to that of FIG. 4 and comprising a block diagram of an example next hop determiner.

FIG. 7 shows a network 100 comprising provider AS AS100, intermediary AS AS200, and eyeball ASs AS123, AS456 and ASS789. Each eyeball has a router 501-503 to receive packets on a non-peering connection from a packet output port 902a-902c of the next hop determiner (NHD) 900. Conversely, the NHD has packet input ports 901a-901c to receive packets from respective servers 401-403. Any such server(s) may be filled with packets by a fill, or origin, server 800a of the provider AS AS100, optionally via the NHD. The route indicator feeder 800d of the provider AS may send route indicators over routing feed connection 1200 to the routing input port 903 of the NHD. The route indicators may each comprise at least a prefix and an AS path and optionally a next hop address on one of the non-peering connections, or may comprise at least a prefix and a modified next hop address and optionally an AS path. The prefixes and AS paths may be provided based on a Global Routing Table 800c at the provider AS, which in turn may be based on route indicators received from the intermediary AS AS200 and including prefixes originated the eyeball(s). The content of the table 800c may be combined with CDN logic 800b to determine modified next hop addresses.

In the example NHD 900 of FIG. 7, a predetermined AS identifier, e.g., an AS number, from a store 907 is compared at comparator 904 to AS paths of received route indicators. Where the comparison indicates that an AS path has a predetermined AS number, this number is stored with the prefix of the route indicator, in memory 905. A director 906 routes a packet from a server 401-403 onto a non-peering connection 200-202 when the packet destination address is within a range of one of the prefixes stored in memory 905.

In another example, an NHD may receive modified route indicators having a changed next hop address and a prefix; each modified route indicator may be based on a route indicator obtained, for example, at the provider AS (AS100). In this case, the comparator and predetermined AS identifier store may be dispensed with. When a packet destination address is within a range of one of the prefixes stored in memory 905, the director 906 may route the packet from a server 401-403 to a modified next hop address stored in association with the prefix in the memory 905. In this way, the packet may be transmitted on one of the non-peering connections 200-202.

Figure 8:
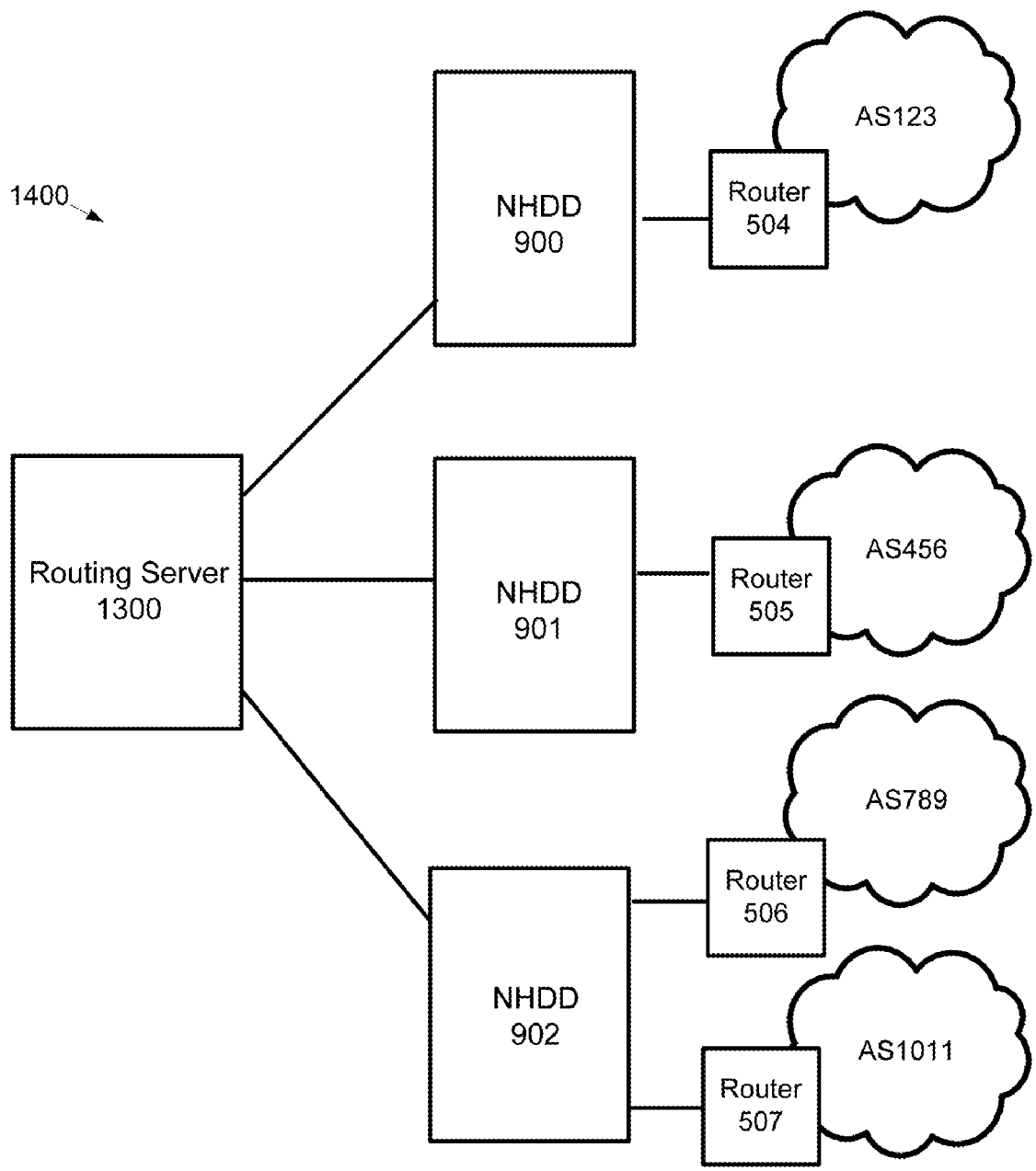
FIG. 8 shows an example next hop determination system comprising a centralised routing server for feeding routing indicators to a plurality of NHDs.

FIG. 8 shows a next hop determination system, which may comprise a plurality of next hop determiners 900 (represented as next hop determination devices (NHDDs) 900-902 in FIG. 8). A routing server may send some or all route indicators to each of the NHDs, which may be at distributed locations within a network. Each NHD may transmit packets on non-peering connections to one or more routers (504, 505, 506, 507) of one or more preferably eyeball ASs (AS123, AS456, AS789, AS1011).

Figure 9:
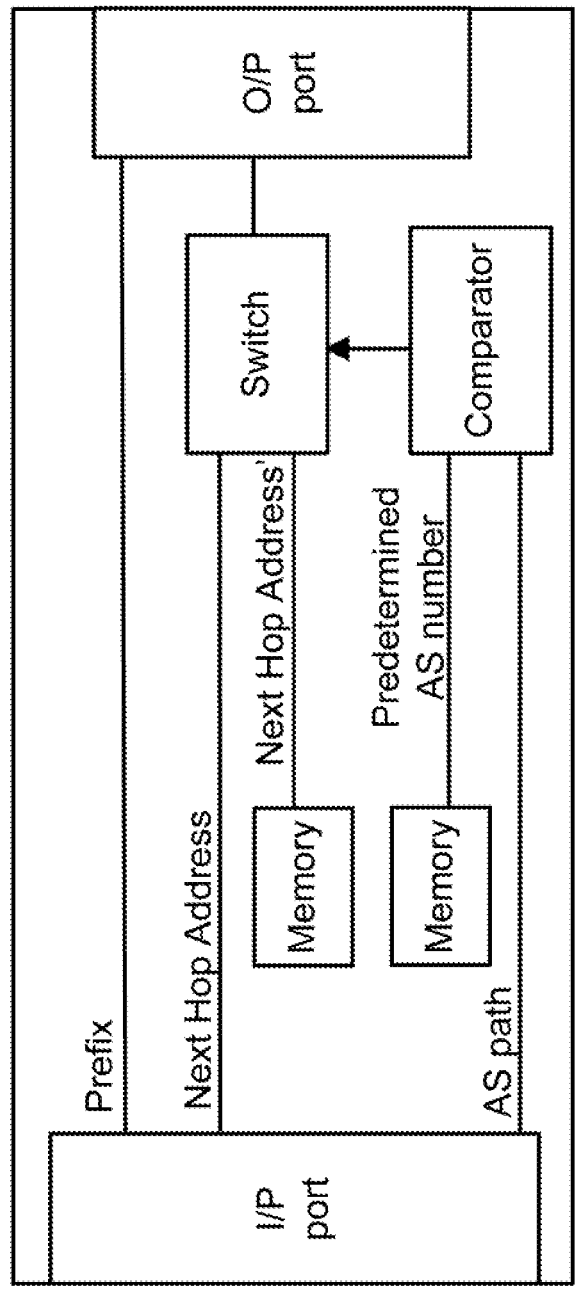
FIG. 9 shows an embodiment of a route indicator feeder, wherein a route indicator modifier comprising a switch may select between forwarding a received next hop address or a stored next hop address (referred to as: Next Hop Address')

FIG. 9 shows an example of a route indicator feeder, which may output to an NHD modified route indicators such as those mentioned above. Specifically, the feeder may receive on an input port route indicators each comprising a prefix, a next hop address and an AS path. A comparator may compare the AS path to at least one predetermined AS identifier, e.g., AS number, stored in a memory. When the comparator indicates that the subject route indicator has an AS path indicating at least one of the predetermined AS identifier (s), the next hop address of the route indicator may be changed to a next hop address on a non-peering connection from the NHD to the AS having the predetermined AS identifier. This change may be achieved by a route indicator modifier in the form of, e.g., a switch to select either the original next hop address or a said changed next hop address for inclusion in the route indicator to be transmitted from the feeder output port.

Figure 10:
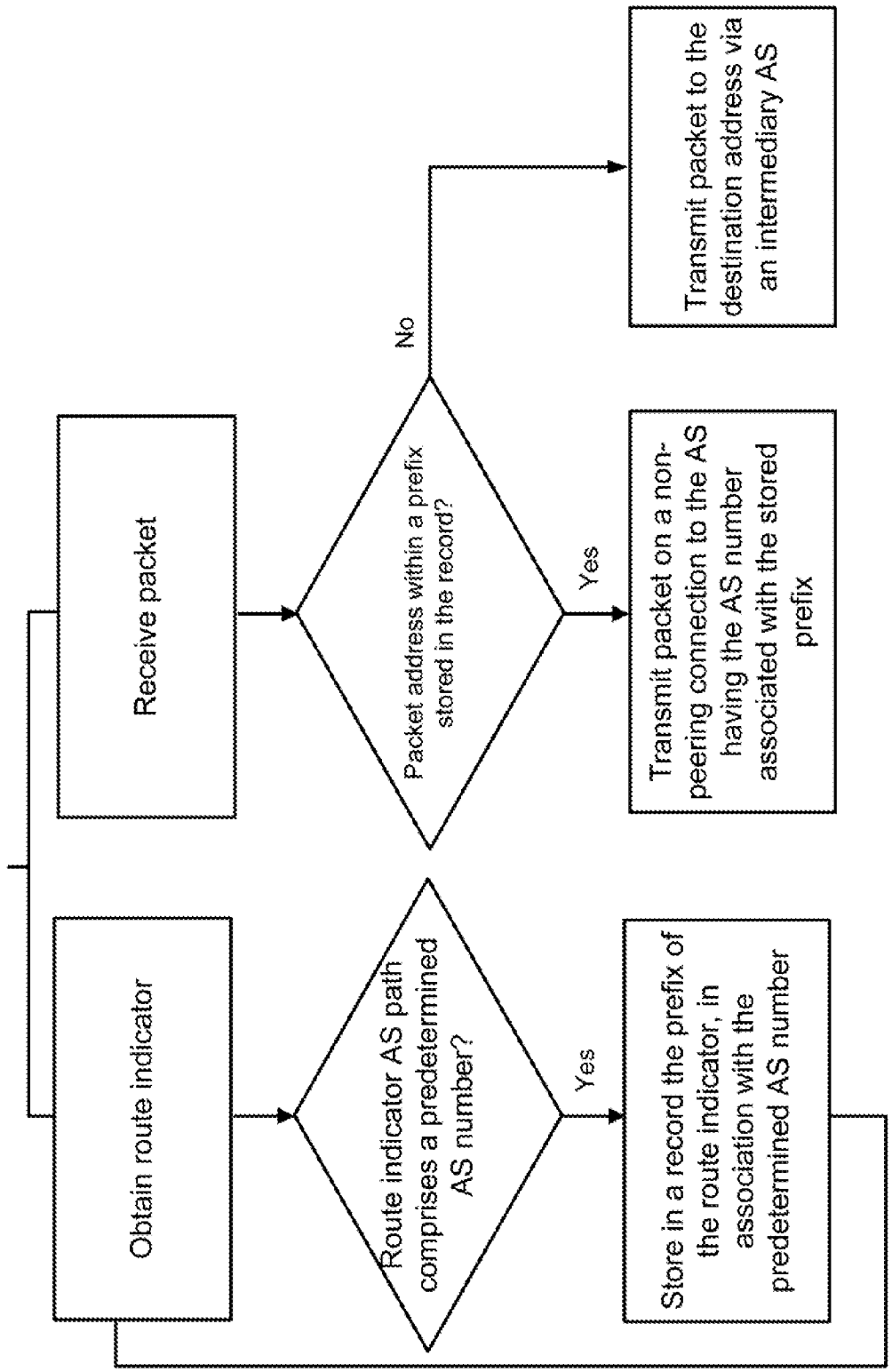
FIG. 10 shows an example flow diagram of an embodiment.

FIG. 10 shows an example flow diagram of an embodiment.

In a specific embodiment, connecting a new device between eyeball network connections and servers in the form of CDN devices may allow to physically reach a number of eyeball network(s) from each CDN device. Given the lack of a single default route, it could be considered to determine the next-hop address by means of an eBGP session between the eyeball network and the CDN provider (this may be a provider AS of an embodiment), though this may have commercial and/or performance issues. Advantageously, the embodiment may instead take advantage of having a view of the full internet route table. Such a table is generally available elsewhere on the content provider's network (especially if they are also an Internet Service Provider) and/or from a public route server.

Using such a table, e.g., a feed from such a table, it may be possible in embodiments to determine prefixes which are transited or originated from any Internet connected Autonomous System (AS) without having any direct relationship with them.

The content of the full Internet route table may be provided by a route indicator feeder in the form of a BGP Feed Device (BFD), which may be a router, route server and/or other such device within the content provider's network.

Figure 3:
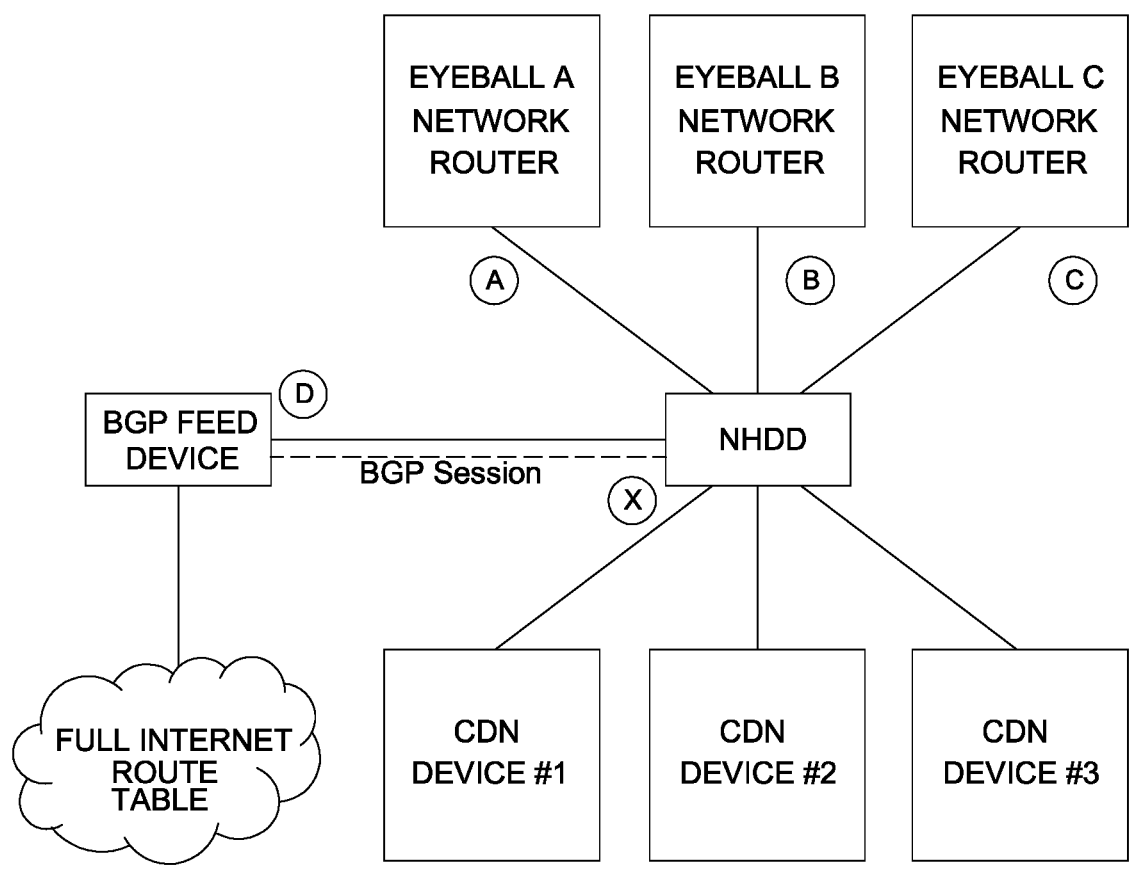
FIG. 3 shows a system embodiment comprising a next hop determiner.

As shown in FIG. 3, this BFD may be connected via a dedicated link to a Next-Hop Determination Device (NHDD), which may well be a multilayer switch with a large number of switched Ethernet ports. The CDN devices may now use the NHDD as their default route.

In such an embodiment, the BFD may send the full BGP route table to the NHDD and a policy on the NHDD determines the next-hop address (A, B or C) based on the AS-Path information. Alternatively, the determination may be carried out on the BFD. A BFD may actually be a route server which is serving BGP to a number of NHDDs, perhaps along with other intelligence. The NHDD may now have a route directly into the content provider's network (the provider AS of an embodiment), avoiding the eyeball networks if required, which could be used as a dedicated fill path. The CDN devices may now able to send all their traffic to the NHDD, which determines whether the next-hop should be A, B or C. There is also the possibility of, preferably using the NHDD, setting the next-hop to D to send traffic via an alternate path on the content provider's network.

Figure 4:
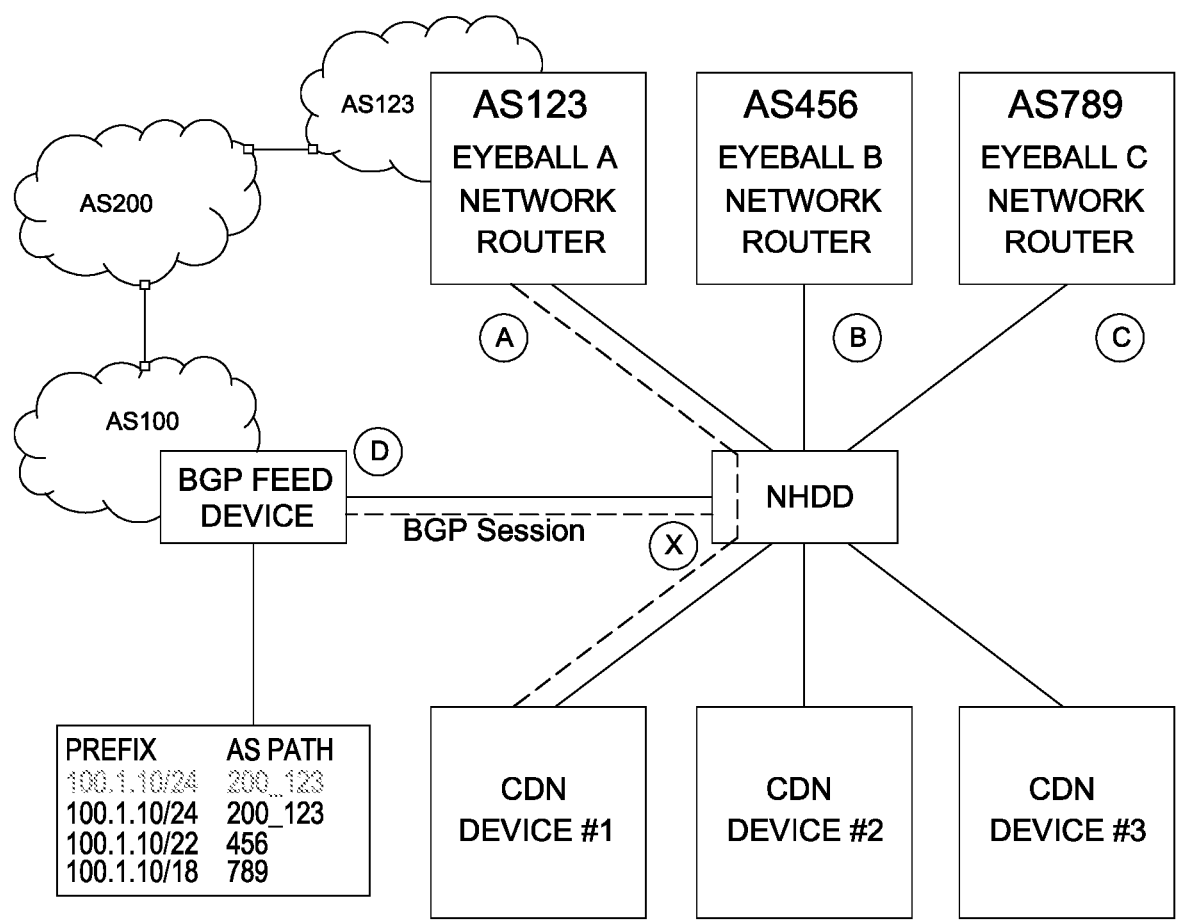
FIG. 4 shows a system embodiment comprising a next hop determiner.
Figure 5:
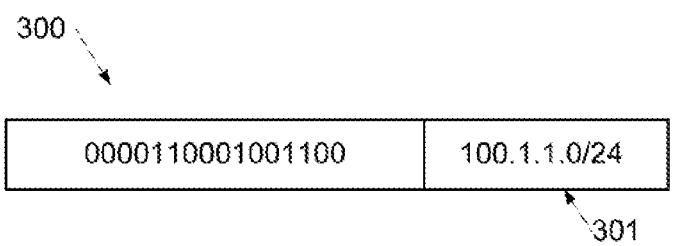
FIG. 5 shows an example packet comprising a destination address and a prefix (301)
Figure 6:
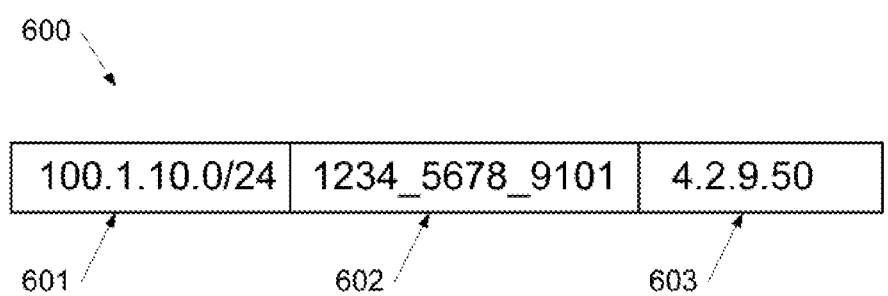
FIG. 6 shows an example route indicator comprising a network prefix indicator 601, an AS path indicator 602 and a next hop address 603 (this may therefore further represent a modified route indicator)

FIG. 4 shows an embodiment in more detail. The content provider (provider AS) is AS100 and wants to send content to an end-user sitting within the 100.1.1.0/24 prefix, which is part of the AS123 eyeball network.

The content provider of FIG. 4 has no direct existing customer or peer relationship with AS123, but may have a physical link to AS123 for content delivery only, with no eBGP peering session running over it. The content provider, using the view of the full route table (see e.g., the representation of a routing table in FIG. 4 having prefixes and corresponding AS paths as network prefix indicators and AS path indicators, respectively), may see the prefixes originated and transited by AS123 via AS200 which connects to AS100. Therefore, the BFD may send all the network prefix indicators, preferably the prefixes themselves, for routing to AS123 (via AS200) by BGP to the next-hop determiner preferably in the form of an NHDD which, preferably using a simple policy/route-map, may alter all AS123 originated and transited prefixes to have a next-hop of A. The NHDD now knows that to reach 100.1.1.0/24 (and all other AS123 prefixes) you use a next-hop of A, but it has learnt this without AS100 having any direct BGP relationship with AS123. As such, all CDN devices connected to the NHDD may now send content to 100.1.1.0/24 using the NHDD as a default gateway, with the NHDD directing traffic to A. The NHDD may also have a default route to D for all prefixes which it does not know directly, meaning no traffic is dropped.

In FIG. 4, CDN device #1 is able to send traffic via the NHDD to an end-user on eyeball network A (AS123) via the NHDD (as shown with the dashed line having the shorter dashes). All the other CDN devices may do the same. Thus, multiple CDN devices may send traffic to multiple eyeball networks, allowing an N:N mux efficiency model, all advantageously without having any direct BGP relationship between the eyeball networks and content provider.

If AS123 announces or withdraws any prefixes using BGP (via AS200), this may be fed to the NHDD by the table feed. The announcement or withdrawal may be reflected in the NHDD as the next-hop decision making is preferably based on the full Internet route table. This means that although there is no direct eBGP relationship between AS100 and AS123, the embodiment may still provide dynamic routing.

The same principle may be used for more and/or all other networks, for example all prefixes originated and/or transited by AS456 and/or AS789. Any traffic to destination prefixes not known via the NHDD using this method may be handed to the provider AS (content provider's main network; next-hop D) via the default route.

The NHDD may be connected to private and/or public interconnects. If the NHDD is connected to an Internet eXchange Point (IXP) broadcast domain, as long as the NHDD itself has an address and the operator is aware of the next-hop addresses of eyeball networks connected to the IXP, the same principle can be applied.

In view of the above, it may be understood that preferred embodiments may make use of an Internet routing table, preferably (i.e., optionally) the Global Routing Table. This may allow an entity such as a 'Next-Hop Determiner' (NHD) or a content and/or service provider (provider AS) to learn all prefixes used on any particular autonomous system (AS) of a network such as the Internet. The NHD may be a device such as a switch (e.g., Multi-Layer Switch (MLS)) or router, or more generally an apparatus for routing and preferably having a plurality of (e.g., Ethernet) ports for receiving and/or transmitting packets. The NHD may be a default gateway for one or more servers, e.g., CDN servers, to transmit packets to. The network prefix indicators may be provided to the NHD as prefixes in accordance with the CIDR notation for specifying IP addresses and their associated routing prefix, e.g., 100.001.1.0/24 for IPv4, or according to IPv6.

The Global Routing Table may be generally visible throughout the Internet, since it may be generated by owners of the Autonomous Systems ASs within the Internet announcing Internet addresses of their networks. The table may be obtained for example from a public route server, or may already be available at a provider AS—the provider may compile its own version of the Table based on addresses advertised by its own customers and/or, more generally, by ASs with whom it peers.

Content of the table, or updates thereto, may in an embodiment be fed to the NHD, e.g., Next-Hop Determination Device (NHDD), which has at least one non-peering connection to an AS such as an eyeball network ('eyeball'). The table content may be transferred by a route indicator feed (such as a BGP message feed, e.g., according to BGP version 4.0) from the provider AS to the NHD. From the route indicators, the NHD may ascertain the prefixes for addresses on at least the AS(s) having non-peering connections to the NHD. When a packet arrives from a server (e.g., CDN server), the NHD may check if the packet destination is within a range of one of the prefixes and, if so, transmit the packet to a next hop address on the corresponding AS indicated by the feed. In this case, the next hop (e.g., address thereof) may be determined by the NHD.

Additionally or alternatively, a next hop address for sending packets from the NHD to an AS on one of the non-peering connection(s) may be determined at the provider AS and fed to the NHD with the prefixes to allow the packets to be routed accordingly. Such next hop addresses may be provided in BGP messages each indicating at least a prefix and corresponding next hop address, preferably also an AS path. Such messages may constitute a feed of modified route indicators, which may be referred to as a "modified BGP feed" where an original next hop address of a BGP message is replaced by the newly-determined next hop address.

Rather than the NHD comprising for example a single device such as a router or switch, the NHD may be a next hop determination system comprising a centralised routing server configured to transmit a feed as described above, e.g., by means of BGP messages, to a plurality of NHDs distributed among one or more networks of one or more ASs. In some embodiments, such a feed may comprise route indicators, e.g., may be a 'modified BGP feed.'

It is further noted that a protocol other than BGP may be used for a feed to an NHD as described above, for example any preferably dynamic routing protocol that enables exchange of routing information between ASs.

In view of the above, the NHD may receive packets each indicating a destination on an eyeball or other type of AS, and may implement a prefix-based policy (which may be generated at the provider AS or at the NHD) for re-directing at least some of the packets onto non-peering connection(s) to the NHD. Based on the policy, the NHD may redirect a packet on to such a connection to an AS, for example when the packet destination address falls within a range defined by a prefix (or network prefix indicator) associated with the AS. Equally, and again based on a feed from the provider AS as discussed above, the NHD may instead route a packet indirectly to its destination via a third party AS, for example when the packet destination address falls outside any range defined by prefix(es) of AS(s) on non-peering connections to the NHD.

In a modified feed embodiment, the changed/modified next hop address of a modified route indicator, e.g., a BGP next-hop indicator (e.g., address), may be used internally within the NHD for the re-direction of the packet to the appropriate outlet port of the NHD for the packet's destination. It is further noted however that the modified route indicator, or specifically the modified next-hop indicator, may be used internally and/or externally to the NHD, for example for monitoring of the NHD re-directing activity. Even where the feed does not comprise changed/modified next hop indicators however, the NHD may nevertheless generate records, which each indicate that a packet has been re-directed onto a non-peering connection, and which may be used internally to the NHD or forwarded to an external monitoring apparatus, By use of the feed preferably according to a dynamic routing protocol, e.g., in a modified BGP feed embodiment, the NHD may implement dynamic routing between at least one packet server (preferably CDN device) and at least one (preferably eyeball) AS on non-peering connection(s) to the NHD. Advantageously, each of a plurality of CDN devices may thus serve packets for any one or more of a plurality of eyeballs. An embodiment using one or more NHDs to route packets dynamically between a plurality of servers and a plurality of non-peering ASs may effectively provide N:N multiplexing of packets (where N is greater than 1). (A non-peering AS generally is an AS that does not peer with the provider AS).

It is further noted that routing in an embodiment using a BGP feed as above may generally be considered to be BGP-like because routing performed by the NHD may be changed automatically depending on a BGP feed (e.g., comprising updates to the Global Routing Table and/or modified next hop addresses). Moreover, the use of a dynamic routing protocol feed such as a BGP feed may allow the NHD to perform efficient and/or automatic dynamic routing to, e.g., eyeball(s), even where packets are not transmitted onwards by the NHD over peering connections.

An embodiment may be advantageous where for example an AS such as an eyeball announces new prefixes only to intermediary (third party) AS(s) with whom it has a peering relationship, and the intermediary AS(s) propagate the prefixes thus making them known to all parties connected to the intermediary AS(s), e.g., making them known to the provider AS. Such an embodiment may advantageously provide high routing reliability, with regard for example to the generally high accuracy of BGP information and/or the shorter route to the target AS, e.g., eyeball, compared to a route via the intermediary AS(s).

An NHD may interface with any non-peering AS using, e.g., a 1 Gbit/s, 10 Gbit/s or 100 Gbit/s Ethernet interface, and to any server, e.g., CDN device, using a different one of such interfaces. Thus, two different interfaces of the NHD may be used to transfer packets from a CDN device through to such an AS. In this regard, embodiments generally provide IP-over-Ethernet connections to and/or from the NHD, or any other Layer 2 protocol based connection (Layer 2 generally being the Data Link layer of the Open Systems Intercommunication (OSD) communication model, e.g., part of the link layer in the TCP/IP). Advantageously, there is no need to match the Layer 2 connectivity of the non-peering AS(s) and CDN device(s). Embodiments may thus effectively provide Layer 3 solutions in networks using Layer 2 protocols such as Ethernet.

An NHD may be applied in a system as shown in FIG. 4, wherein it may be desired to transmit a packet via a server such as CDN device #1, to an eyeball AS, e.g., AS123. The eyeballs of FIG. 4 may be located in different locations around the world. Each eyeball may comprise network routers generally used to route traffic within the eyeball, in addition to network routers to receive traffic from the NHD. The packet may arrive at the CDN device from the provider AS, e.g. AS100, for example from a fill, or origin, server of the provider AS. (Noting that references such as AS100, AS200, AS123 etc. are merely example network identifiers and are not intended to indicate any technical characteristics of the ASs). One or more of the CDN devices may belong to the provider AS. Packets may be transmitted from the provider AS to a CDN device via the NHD. The packet may then be transmitted from the CDN device to the NHD and routed via the third party (intermediary) AS, e.g., AS200, to the destination, eyeball AS. This may involve routing the packet back from the NHD to the provider AS and onward to the third party AS to forward to the destination. Such routing via the third party AS may be based on a route indicator, e.g., BGP message from the provider AS to the NHD, indicating a node (e.g., the address thereof) of the provider AS as the next hop. Based on a prefix-based redirection policy implemented in the NHD, however, the packet may instead be routed more directly from the NHD to a non-peering destination AS (or at least to the destination via such a non-peering AS) without traversing the provider AS or third party AS.

The CDN devices may be located in one or more facilities or locations and may be part of the provider AS, e.g., AS100. The CDN devices may respectively be responsible for delivering different content sub-sets, i.e., may have different bindings. For example one CDN device may have a binding for a first specific customer(s), another CDN device may have a binding for a second specific customer(s), another CDN device may have a binding generally for other customers of the CDN, a further CDN device may have a binding dedicated to live streaming (e.g., football) from a particular customer, etc.

In a preferred embodiment, the provider AS, e.g. AS100 of FIG. 4, has a route server (RS) that receives routing (e.g. BGP) information preferably based on the Global Routing Table. Indeed, the RS may have full view of the table. The routing information at the RS may be combined with Content Delivery Network (CDN) logic (see CDN logic store 800*b* in FIG. 7) that is used by the provider AS to select CDN devices for delivering packets. The resulting routing information may be fed to the NHD. Thus, the RS and/or NHD may be able to determine for which prefixes the NHD re-directs, based at least partly on the CDN logic.

Such CDN logic may be similar to routing rules for a CDN Rendezvous service and thus may determine that packets from specific customers (e.g., telephonic customers) of the provider AS use a particular CDN or CDN cluster, for example such a CDN or cluster in a particular location. Additionally or alternatively, CDN logic such as for a Rendezvous service may determine how a CDN determines which CDN server to serve from for a particular target, e.g., eyeball. Such CDN logic for implementing commercially agreed delivery by means of a CDN may be obtained from a CDN Rendezvous server and may be combined with routing information preferably from a Global Routing Table, in order to tailor the re-direction policy implemented by the NHD.

(A Rendezvous service can, when a client or user requests a content resource from a network entity, select a server proximate (physically or logically) to the client/user and redirect the client/user to that server. More specifically, in the context of a CDN or similar system, when an end user requests a certain resource associated with a customer of a CDN, the CDN (e.g., by way of DNS) may select a server or cache (e.g., based on one or more criteria) to deliver the requested resource to the end user on behalf of the customer and then directs the end user to the selected server or cache, thereby causing the end user to 'rendezvous' with the selected server or cache for delivery of the requested resource. A Rendezvous service may for example be provided by Level 3 Communications LLC®).

Further considering the monitoring of NHD routing activity, where route indicators are received in or as respective messages of a feed to the NHD, these messages (or data thereof, e.g., the network prefixes), may be marked/stamped and monitored to assess the routing activity. Any message to be used by the NHD for re-direction of packets may be marked and forwarded to an internal or external monitoring system. Such messages may have modified next-hop addresses (as described above). The thus marked feed, messages and/or prefixes may be monitored and/or analysed for example to determine to which and/or how many non-peering ASs traffic is being re-directed to by the NHD, how many messages, e.g., next hop addresses thereof, are being used in modified form, whether the NHD is performing correctly, etc.

Advantageously, such a feed to the NHD may be stamped to indicate route indicators (e.g., BGP messages) and/or network prefix indicators that are transited and/or are originated at a particular AS, preferably an AS on a non-peering connection to the NHD. For example, a BGP message having a prefix 100.1.10.0/24 and AS path 1234_5678_9101 (and optionally a next-hop indicator, e.g., 4.2.9.50, which may be a changed/modified next hop address) may be recognised and marked as an originated route indicator (i.e., originated from AS 9101), whereas a BGP message comprising prefix 100.1.10.0/24 and AS path 1234_5678_9101_1121 (and optionally a next hop address) may be marked as a transited route indicator (i.e., transited through AS 9101). The latter route indicator having the extra sub-code of the AS path information is recognised as a transited route indicator, i.e., it may correspond to a customer of the 9101 AS. The former route indicator having the AS path information ending with the 9101 AS number is recognisable as being derived from an address announcement from the 9101 AS itself.

Transited and/or originated route indicators/network prefix indicators may be marked as such when they arrive at the NHD or in an associated analysis and/or monitoring apparatus. Where for example a contractual relationship exists between an eyeball and a provider AS, it may be preferred only to monitor NHD activity with respect to the eyeball-originated prefixes. The NHD may identify only originated or only transited route indicators/network prefix indicators in an incoming BGP feed (e.g., only originated or only transited by any one of ASs on non-peering connections to the NHD, or only originated or only transited by a specific AS, e.g., the 9101 AS) and implement a policy to perform re-direction based on only the marked (or non-marked) route indicators/prefixes. As another example, an NHD may mark the network prefix indicators of routing feed messages having a predetermined AS identifier, e.g., AS number 1234, in the AS path information and re-direct packets for only these prefixes. Additionally or alternatively, an NHD may detect (or reject from the feed) network prefix indicators of route indicators having a predetermined AS identifier, e.g., AS number 5678, in the AS path information and not re-direct packets for any of these prefixes. Selection and/or rejection of particular prefixes in this way may allow the packet re-direction of an embodiment (e.g., based on a modified BGP feed) to be performed for example only for residential or commercial customers of the eyeball. Similarly, the selection and/or rejection may be used to provide such re-direction only for certain organisations or to exclude certain organisations for such re-direction.

Further regarding the marking, this may be done using BGP communities where the route indicators are BGP messages. A route indicator advertised via BGP may consist of a prefix (made up of a network (an address) and a netmask), a next-hop indicator and a number of other attributes, of which AS-Path is one. Another attribute is "communities" which are a number administrator defined 'tags' that can be added to a BGP advertisement for whatever purpose the operator wishes. These communities can be used to assist in making routing decisions, but may just be for informational purposes.

Examples of marking for monitoring purposes are as follows:

1) An NHDD may receive the entire routing table via BGP; it will only "select" the prefixes which it is interested in via a policy; for instance only those with an AS-Path including AS123. It may stamp these selected prefixes with a community such as 100:5000; and/or 2) the NHDD would identify prefixes which _originate_ from an eyeball network (i.e., the AS-Path ends with 100) with a community, such as 100:5001; and/or 3) The NHDD would identify prefixes which _transit_ an eyeball network (i.e., the AS-Path has 100 as an element, but not the final element, indicating AS100 is acting as a transit) with a community, such as 100:5002.

Such, and/or other, types of marking may allow the NHDD to have a small subset of the original global route table selected. All active prefixes on the NHDD may now have 100:5000 marked. This may allow to check that active prefixes are correct. If a prefix is active on the NHDD and doesn't have 100:5000 stamped, this may indicate that something has gone wrong.

This small subset of prefixes may be grouped in two parts; those which are originated prefixes and those that are transit prefixes. The prefixes with a specific community may be listed on a device, so the operator may be able to note the following:

X=The total number of prefixes with, e.g., 100:5000
Y=The total number of prefixes with, e.g., 100:5001
Z=The total number of prefixes with, e.g., 100:5002

As a verification, the operator may be able to ensure that X=Y+Z. Also knowing the breakdown of Y and Z may be useful for operating the system, and may be used for network analysis purposes.

More generally, it is noted that communities may be used to determine the type and geographic origination of a prefix. Here's a real world example:

```
sar1.lon1#show ip bgp 139.222.1.1
BGP routing table entry for 139.222.0.0/16, version 1260626819
    786
        4.69.187.132 (metric 31330) from 4.69.130.72 (4.69.130.72)
            Origin IGP, metric 300, localpref 100, valid, internal, best
                Community: 3356:2 3356:22 3356:100 3356:123 3356:500
3356:2079
            Originator: 4.69.187.132, Cluster list: 0.0.7.11
```

(In this case, 139.222.1.1 is an address, 139.222.0.0/16 is the prefix. The address falls within the prefix. 4.69.187.132 is the "next-hop" and 4.69.130.72 is where this device learnt this from.)

The communities can be decoded according to examples such as below:

3356:2=Europe
3356:22=Backbone2
3356:123=Customer learnt (rather than peer)
3356:100=Localpref is 100
3356:500=Learnt in the UK
3356:2079=Learnt in London So, for example, all prefixes with 3356:2079 stamped could be looked at to identify the detail and quantity of prefixes learnt specifically in London.

Considering the wider context of embodiments, it is noted that an embodiment may be used for re-directing packets in the Internet or, more generally, in other networks comprising sub-networks such as ASs. For example an embodiment may be implemented in an Intranet. Generally, an embodiment may be implemented in a Wide Area Network (WAN) with separate entities, e.g., a network of a large and/or global company wherein different departments have confederations, e.g., private ASs. The ASs may be in different countries, e.g., the UK and US. Any one of more of the ASs may receive on a non-peering connection redirected traffic from an NHD It is further noted regarding the wider context that embodiments preferably provide non-differentiated quality of service in accordance with net neutrality.

One or more of the target, e.g. eyeball, AS(s) may even be/comprise a Virtual Private Network (VPN) preferably having an IP address. In an embodiment, a feed to the NHD, e.g., BGP feed, may be used with CDN logic to tell the NHD to send packets to a private network that does not advertise its addresses.

Packet re-direction when performed by an NHD may allow for example accelerated delivery to eyeballs, higher reliability regarding packet loss, and/or reduced latency (compared to traditional routing through third party network(s))—noting that lower latency tends to give higher throughput. Reliability may be increased by implementing the NHD as a fabric of (e.g., 10) switches, preferably in one virtual chassis. Each such switch may be configured to operate identically to the others of the fabric of switches. Thus, redundancy may be provided.

Figure 1:
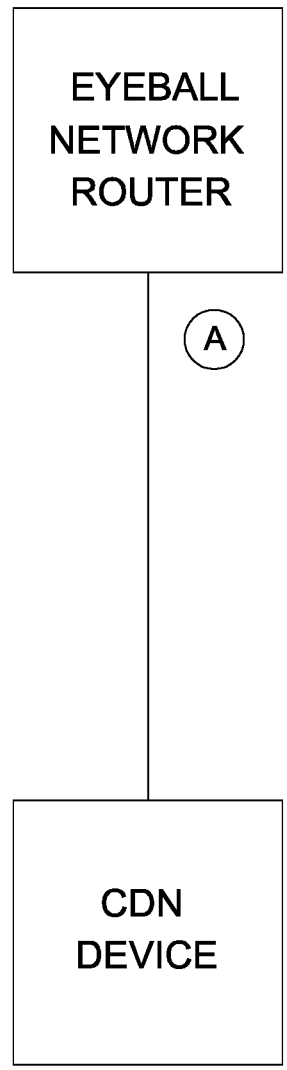
FIG. 1 shows a single, static link between an eyeball and a CDN server.

Another advantage of an embodiment may be identified in relation to congestion. In a system having merely a single link between a CDN server and eyeball as shown in FIG. 1, the eyeball is served only by the CDN server, which may act as a Deep Edge Cache (DEC; generally a DEC comprises a server connecting to a router in an eyeball). Since the CDN server only connects to that eyeball, difficulties may be encountered in getting content onto that CDN sever. For example, the server may become, or approach being, full, thus causing congestion.

Similarly, if any content is sent to the eyeball from the CDN server via a third party AS, routes through the third party AS itself may become congested such that the CDN server, e.g., DEC, may not be filled to capacity when necessary for, e.g., continuous streaming. This may reduce the quality of live streaming for media channels.

Furthermore, an embodiment may use the NHD 'in reverse' so that 2-way communication with a fill, or origin, server of the provider AS may be achieved. Such a communication may comprise a handshake, e.g., may comprise a TCP communication involving a handshake process (connection establishment) before data transfer. The TCP communication may be performed between the NHD and provider AS (e.g., a fill server of the provider AS) to transfer content from the provider AS (e.g., AS100) onto one or more CDN devices (e.g., CDN devices #1-3; these may be distributed in different locations), preferably via the NHD.

The path for getting content from the provider AS onto CDN device(s), e.g., from the provider AS via the NHD to a CDN device as above, may be referred to as an 'on-net filler route'. Since the NHD may announce to the provider AS, e.g., a BGP feed device thereof, who (e.g., which eyeball(s)) the NHD is connected to, the announcement may be used by the provider AS to perform the provider-to-NHD communication part of a, e.g., TCP, handshake and/or to ensure that a TCP fill mechanism for filling the CDN device works. Use of the NHD in this way may ensure that content gets onto the CDN device in an accelerated and/or reliable manner.

Advantages may be achieved in comparison to an arrangement where a content provider dedicates content delivery equipment to the eyeball network and connects it directly to that eyeball network, i.e., provides a Deep Edge Cache (DEC)). In such an arrangement, equipment is dedicated to that eyeball network only as it may have no dynamic routing capability. An embodiment may however allow equipment from the content provider to connect to multiple eyeball networks with a dynamic routing capability which enables this equipment to determine which network to hand traffic to, without using, e.g., eBGP, peering directly to the eyeball network(s).

To assist further in understanding advantages of embodiments, we briefly describe that in an alternative, DEC arrangement, CDN equipment is generally connected directly to the eyeball network, and a default route is placed on that CDN device to allow packets to be routed to the eyeball network; a specific CDN device may be selected for a specific end user. Such an arrangement is shown in FIG. 1, where the address used at point 'A' is used as the next-hop for all destinations, also known as a default route. Clearly the result of this is that the CDN device is only capable of delivering content to a single eyeball network, as it only has a single static route. Even if multiple static routes were configured on the CDN device, this would not be dynamic routing and would require manual intervention to add or remove routes, which is neither dynamic nor scalable. Another side-effect of this is that traffic from the content provider which is destined to the CDN device (known as 'fill traffic') has to traverse the eyeball network, often via congested peering connections elsewhere, which can result in suboptimal fill which is especially bad for live content.

An alternative is to run eBGP between the content provider and the eyeball network either via the CDN device itself, or via a router between the two. As discussed previously, this is sometimes not acceptable for commercial and/or performance reasons.

Figure 2:
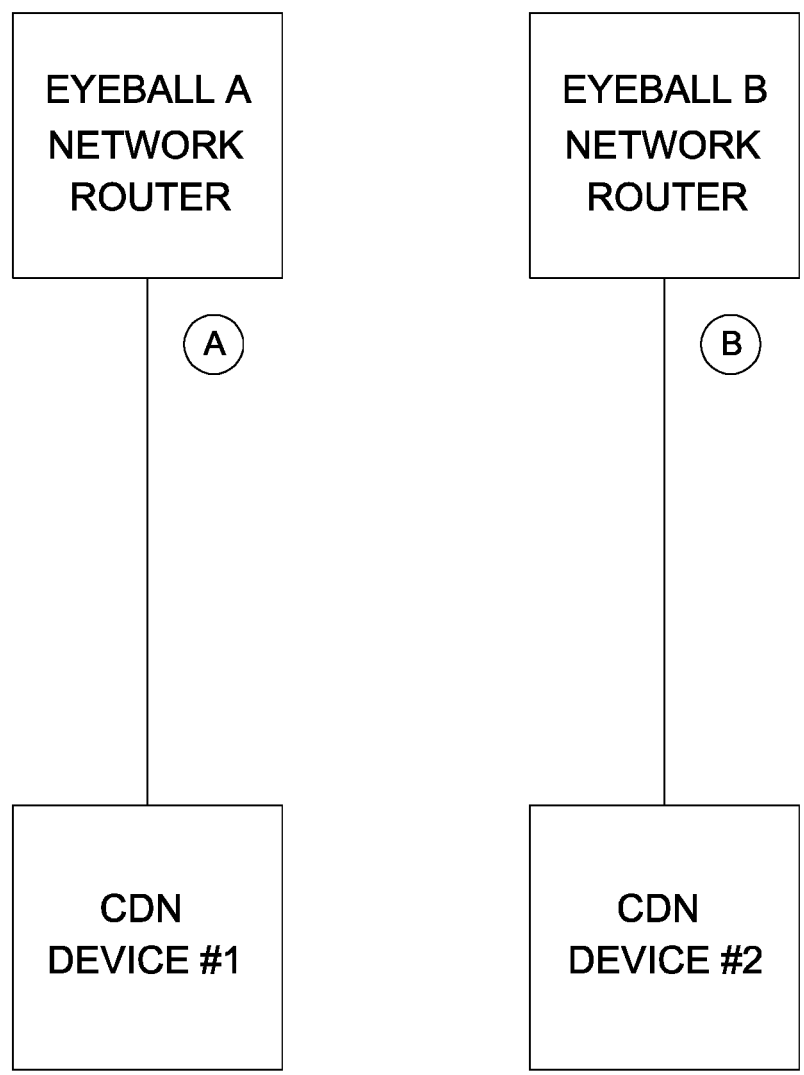
FIG. 2 shows static links each dedicated solely to a respective eyeball and CDN server pair.

If this alternative is used to deliver content to more than one eyeball network, we can see, as shown in FIG. 2, that a discreet device is required for each eyeball network. Here CDN Device #1 can only deliver content to Eyeball Network A, and CDN Device #2 can only deliver content to Eyeball Network B. This 1:1 [non]-mux effect is inefficient in the use of both the CDN device capacity and the egress capacity from the CDN provider to the eyeball network.

In this alternative, CDN Device #1 has a default route to 'A' and CDN Device #2 has a default router to 'B'. There remain however difficulties at least with the content network provider filling the CDN devices. There is also the disadvantage that, without BGP, there is no way for the CDN device to connect to multiple eyeball networks as servers have limited network interfaces, and even if it did have multiple interfaces, without BGP to the eyeball networks, it would be unable to determine the correct next-hop.

Figure 11:
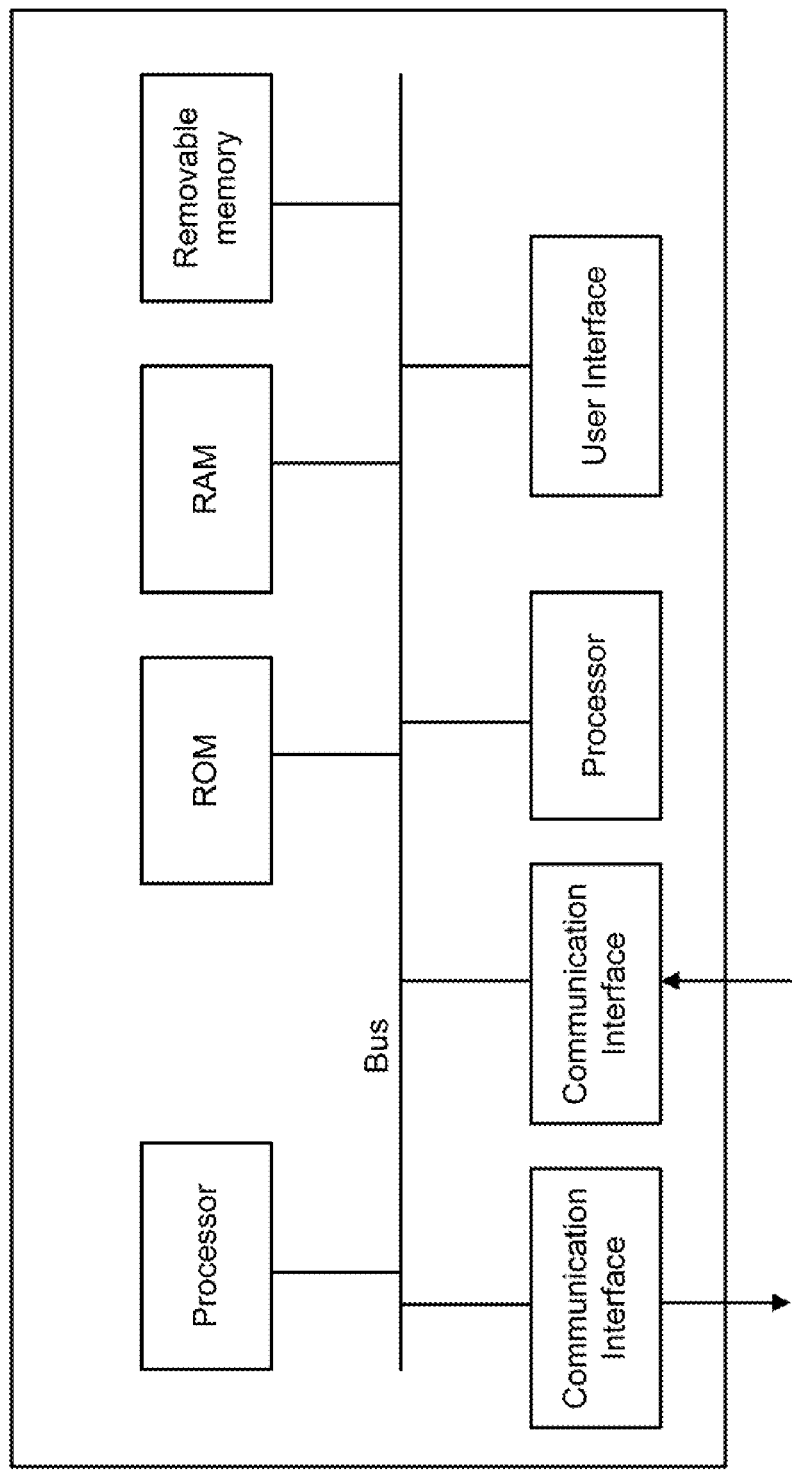
FIG. 11 shows an example computing device on which an embodiment, e.g., NHD or roué indicator feeder, may be implemented.

In view of the above, and further considering advantages where for example a next hop is modified/selected to be a relevant target, e.g., eyeball, AS (e.g., an address thereof) based on an AS path of a route indicator, any one or more of the present may be achieved by an embodiment:

N:N mux allows to connect multiple CDN nodes to multiple eyeball networks;
High performance for CDN;
Low cost/space/power switch;
Supports LAG to eyeball network or CDN;
Dedicated fill channel;
Reduced/no layer-3 complexities;
Can repurpose CDN kit logically;
40GE support if needed; and/or
No external BGP FIG. 11 shows an example computing device on which an embodiment of the invention may be implemented. For example, one or more computing devices may be used to implement the/each next hop determiner (e.g., NHDD) and/or route indicator feeder of an embodiment. The computing device such as that of FIG. 11 comprises a bus, at least one processor, at least one communication port (e.g., Ethernet such 1, 10, 100 Gigabit Ethernet, RS232 and/or USB for packet transmission and/or reception, programming, monitoring and/or user interfaces etc.), and memory, all generally coupled by the bus (e.g., PCI, SCSI). The memory may comprise non-volatile memory such as read only memory (ROM) or a hard disk and/or volatile memory such as random access memory (RAM, e.g., SRAM or DRAM), cache (generally RAM) and/or removable memory (e.g., EEPROM or flash memory). The processor may be any known processor, e.g., an Intel (registered trademark) or ARM (registered trademark) processor. A user interface, e.g., display screen and/or keyboard may be provided.

The invention further provides processor control code to implement or control operation of the above-described next hop determiner and/or route indicator feeder, for example on an embedded processor. The code may be provided on a carrier such as a disk, CD- or DVD-ROM, programmed memory such as read-only memory (Firmware), or on a data carrier such as an optical or electrical signal carrier. Code (and/or data) to implement embodiments of the invention may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog (Trade Mark) or VHDL (Very high speed integrated circuit Hardware Description Language). As the skilled person will appreciate such code and/or data may be distributed between a plurality of coupled components in communication with one another.

Drawings references may correspond to features as below:

| | |
|---|---|
| 100 | network |
| AS100, AS200, AS123, AS456, AS789, AS1011 | autonomous system |
| AS123, AS456, AS789, AS1011 | (optionally eyeball) network |
| AS100 | provider AS |
| AS200 | intermediary (third party) AS |
| 200, 201, 202 | non-peering connection |
| 300 | packet |
| 301 | prefix comprising address and netmask |
| 401, 402, 403 | server, e.g., CDN server |
| 501-507 | router |
| 600 | route indicator |
| 601 | network prefix comprising address and netmask |
| 602 | AS path |
| 602a, 602b, 602c | AS identifier, e.g., AS number |
| 603 | next hop address |
| 800a | fill, or origin, server |
| 800b | CDN logic |
| 800c | Internet routing table, e.g., Global Routing Table |
| 800d | route indicator feeder, e.g. BGP feed device |
| 900 | next hop determiner (NHD), e.g., NHDD |
| 901a, 901b, 901c | packet input port |
| 902a, 902b, 902c | packet output port |
| 903 | routing input port (optionally further for output) |
| 904 | comparator |
| 905 | memory |
| 906 | director |
| 907 | predetermined AS number store |
| 1000, 1001, 1002 | server connection |
| 1200 | routing feed connection |
| 1300 | routing server |
| 1400 | next hop determination system |

No doubt many other effective alternatives will occur to the skilled person. For example, any reference to a provider AS, eyeball and/or CDN in this specification may be substituted with reference to any type of AS or network. It will be understood that the invention is not limited to the described embodiments and encompasses modifications apparent to those skilled in the art lying within the spirit and scope of the claims appended hereto.

The invention claimed is:

1. A method of routing packets in a network comprising Autonomous Systems (ASs), the method comprising:
    obtaining route indicators each comprising:
        an indicator of a network prefix
        an indicator of a next hop address; and
        an indicator of an AS path for delivering packets to an AS having the network prefix;
    identifying at least one said route indicator having an AS path indicator comprising a predetermined AS identifier;
    storing the network prefix indicator of each said identified route indicator;
    receiving at least one packet having an address indicating a destination;
    if the destination address of said packet is within an address range defined by said stored prefix indicator, transmitting the packet on a non-peering connection to the AS having the predetermined AS identifier; and
    if the destination address is not within said stored network prefix indicator, transmitting the packet to the next hop address of said route indicator having a network prefix indicator defining an address range comprising the destination address,
    wherein the network further comprises a provider AS and a next hop determiner, and wherein:
    the receiving comprises establishing at the next hop determiner at least one connection for transfer of the at least one packet from the provider AS to at least one server via the next hop determiner, wherein the establishing comprises a two-way communication involving a handshake process before data transfer, and receiving at the next hop determiner the at least one packet from the at least one server, and wherein the two-way communication is between the next hop determiner and a fill server of the provider AS.

2. The method as recited in claim 1, wherein the non-peering connection is one of a plurality of non-peering connections and said predetermined AS identifier is one of a plurality of predetermined identifiers, and wherein:
    the identifying comprises identifying at least one said route indicator having an AS path indicator comprising said predetermined AS identifier;
    the storing comprises storing the network prefix indicator of each said identified route indicator in association with an indication of the AS having the predetermined AS identifier indicated by the AS path indicator of the identified route indicator; and
    the transmitting comprises selecting said non-peering connection based on the AS indication associated with the stored prefix that defines the address range comprising the destination address of the packet, and transmitting the packet on the selected non-peering connection.

3. The method as recited in claim 1, wherein the at least one packet comprises packets received from a plurality of content delivery network servers.

4. The method as recited in claim 1, comprising obtaining the route indicators from a Global Routing Table.

5. The method as recited in claim 1, wherein the network comprises a provider AS and the obtaining comprises receiving the route indicators from the provider AS.

6. The method as recited in claim 1, wherein the route indicators comprise messages in accordance with a dynamic routing protocol for exchanging routing information between ASs, wherein the dynamic routing protocol comprises a Border Gateway Protocol.

7. The method as recited in claim 1, further comprising:
    modifying the identified route indicator by changing the next hop address of the identified route indicator to indicate an address on the non-peering connection to the AS having the predetermined AS identifier;

the storing comprising storing the network prefix indicator of at least one said modified route indicator in association with the changed next hop address of that modified identified route indicator; and the transmitting comprising transmitting the packet to said stored changed next hop address that is associated with said stored network prefix indicator defining an address range comprising the packet destination address.

8. The method as recited in claim 1, comprising upon said transmission of said packet on said non-peering connection marking data of said route indicator having a network prefix indicator defining a range comprising a packet destination address and monitoring on the basis of the marked route indicators:
- to which, or to how many, ASs packets are being transmitted on non-peering connections;
- how many packets are being transmitted to said AS having a predetermined AS identifier;
- which, or how many, next-hop addresses are changed;
- which, or how many, messages are transited by said AS having a predetermined AS identifier;
- which, or how many, messages are originated by said AS having a predetermined AS identifier.

9. The method as recited in claim 1, comprising using the routing indicators together with CDN logic, to determine for which network prefix indicators of the route indicators packets are transmitted on said non-peering connection.

10. The method as recited in claim 1, wherein the method comprising:
- announcing by the next hop determiner to the provider AS at least one AS the next hop determiner is connected to by said non-peering connection; and
- using at the provider AS the announcement, to perform the 2-way communication.

11. The method as recited in claim 1, wherein the AS on the non-peering connection comprises an eyeball network.

12. The method as recited in claim 1, wherein the at least one packet is received from at least one CDN server.

13. A route indicator feeder for providing modified route indicators, comprising:
- an input port to receive route indicators, each said route indicator comprising:
  - an indicator of a network prefix associated with a network;
  - an indicator of a next hop address; and
  - an indicator of an AS path for delivering packets to an AS having the network prefix;
- a comparator to compare a predetermined AS identifier to each said AS path indicator, to identify said route indicator having an AS path indicator comprising the predetermined AS identifier;
- a route indicator modifier to, in response to said identification by the comparator:
  - change the identified route indicator to indicate an address on the AS having the predetermined AS identifier; and
  - changes the next hop address at a next hop determiner of the identified route indicator to be the address on the AS having the predetermined AS identifier; and
- an output port to transmit the modified route indicator, wherein the network further comprises a provider AS and the next hop determiner, wherein at least one connection is established, at the next hop determiner, for transfer of the packets from the provider AS to at least one server via the next hop determiner, wherein the establishing comprises a two-way communication involving a handshake process before data transfer, wherein the next hop determiner receives the packet from the at least one server, and wherein the two-way communication is between the next hop determiner and a fill server of the provider AS.

14. A system for routing packets in a network comprising Autonomous Systems (ASs), the system comprising:
- a computing device including a processor coupled to a system memory, the system memory storing instructions for execution on the processor, the instructions configured to cause the processor to:
  - obtain route indicators each comprising:
    - an indicator of a network prefix
    - an indicator of a next hop address; and
    - an indicator of an AS path for delivering packets to an AS having the network prefix;
  - identify at least one said route indicator having an AS path indicator comprising a predetermined AS identifier;
  - store the network prefix indicator of each said identified route indicator;
  - receive at least one packet having an address indicating a destination;
  - if the destination address of said packet is within an address range defined by said stored prefix indicator, transmit the packet on a non-peering connection to the AS having the predetermined AS identifier; and
  - if the destination address is not within said stored network prefix indicator, transmit the packet to the next hop address of said route indicator having a network prefix indicator defining an address range comprising the destination address,
- wherein the network further comprises a provider AS and a next hop determiner, and wherein:
  - to receive the at least one packet comprises the instructions configured to cause the processor to establish at the next hop determiner at least one connection for transfer of the at least one packet from the provider AS to at least one server via the next hop determiner, wherein the establishing comprises a two-way communication involving a handshake process before data transfer, and to receive at the next hop determiner the at least one packet from the at least one server, and wherein the two-way communication is between the next hop determiner and a fill server of the provider AS.

* * * * *